US008160213B2

(12) United States Patent
Gartner

(10) Patent No.: US 8,160,213 B2

(45) Date of Patent: Apr. 17, 2012

(54) INSTANT MESSAGING AND VOICE MAIL INTEGRATION

(75) Inventor: Jeffrey G. Gartner, Hopewell Junction, NY (US)

(73) Assignee: Avaya Inc., Basking Ridge, NJ (US)

( * ) Notice: Subject to any disclaimer, the term of this patent is extended or adjusted under 35 U.S.C. 154(b) by 1162 days.

(21) Appl. No.: 11/953,833

(22) Filed: Dec. 10, 2007

(65) Prior Publication Data

US 2009/0147931 A1 Jun. 11, 2009

(51) Int. Cl.
*H04M 11/00* (2006.01)

(52) U.S. Cl. .................................. 379/88.13; 379/88.25

(58) Field of Classification Search ............... 379/88.13, 379/88.22–88.25

See application file for complete search history.

(56) References Cited

U.S. PATENT DOCUMENTS

| | | | | |
|---|---|---|---|---|
| 6,343,119 | B1 * | 1/2002 | Creamer et al. | 379/100.01 |
| 6,697,474 | B1 * | 2/2004 | Hanson et al. | 379/201.01 |
| 7,113,767 | B2 * | 9/2006 | Vaananen | 455/412.1 |

* cited by examiner

*Primary Examiner* — Simon Sing

(74) *Attorney, Agent, or Firm* — Maldjian Law Group LLC; John P. Maldjian, Esq.; Alexander D. Walter, Esq.

(57) ABSTRACT

A method of enabling a user of an instant messaging client to forward an audio recording to another person via his or her instant messaging client is disclosed. The recipient's instant messaging client then inquires whether the recipient would like to hear the audio recording immediately. If the recipient answers yes, then the audio recording is played for the recipient through the instant messaging client. In contrast, if the user answers no, or is "unavailable," or does not answer at all, the instant messaging client forwards the audio recording a voice mailbox associated with the recipient for later retrieval in well-known fashion via a telephone. This invention is particularly advantageous when the recipient is engaged in a telephone call when the audio recording arrives because it enables the recipient to hear the message immediately and without having to access the voice mail system while engaged in call.

9 Claims, 3 Drawing Sheets

Telecommunications System 100

102-1 Data Processing System
User 101-1
103-1 Telephone
102-2 Data Processing System
User 101-2
103-2 Telephone
102-3 Data Processing System
User 101-3
103-3 Telephone
The Internet 110
PSTN 111
104 Voice Mail System

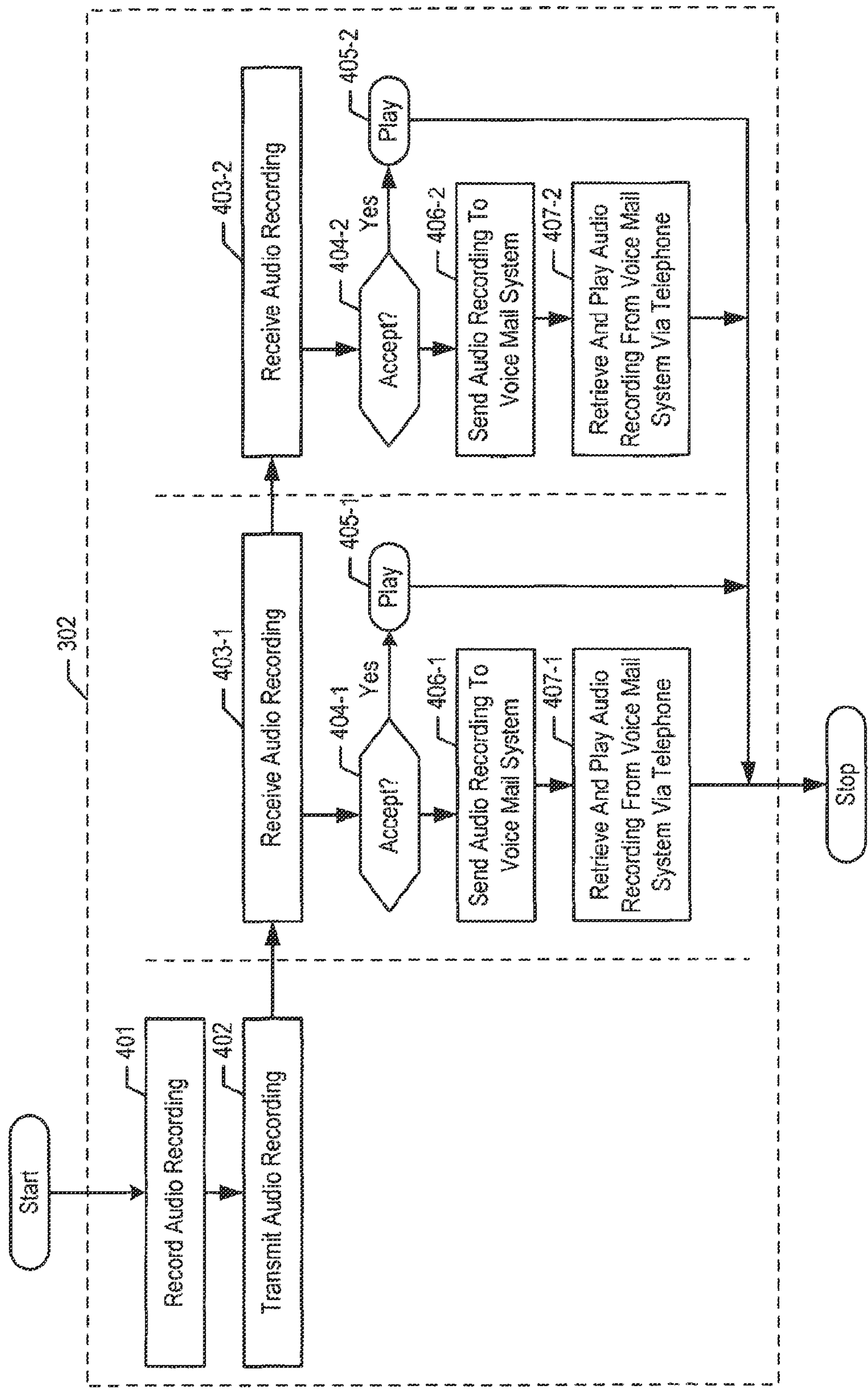
Figure 4
Start
Record Audio Recording
401
Transmit Audio Recording
402
302
Receive Audio Recording
403-1
Accept?
404-1
Yes
Play
405-1
Send Audio Recording To Voice Mail System
406-1
Retrieve And Play Audio Recording From Voice Mail System Via Telephone
407-1
Receive Audio Recording
403-2
Accept?
404-2
Yes
Play
405-2
Send Audio Recording To Voice Mail System
406-2
Retrieve And Play Audio Recording From Voice Mail System Via Telephone
407-2
Stop

INSTANT MESSAGING AND VOICE MAIL INTEGRATION

FIELD OF THE INVENTION

The present invention relates to telecommunications in general, and, more particularly, to instant messaging and voice mail systems.

BACKGROUND OF THE INVENTION

Instant messaging is form of real-time communication between two or more people based on typed text. The text is conveyed by data processing systems (e.g., computers, personal digital assistants, Blackberrys, etc.) over a network such as the Internet or an intranet.

Instant messaging offers real-time communication and allows easy collaboration, which might be considered more akin to genuine conversation than e-mail's store and forward/retrieve mechanism. In contrast to e-mail, the Instant Messaging parties know whether the peer is available via a Presence Service that is inherent in the Instant Messaging system. Most Instant Messaging systems allow the user to set an online status or away message so peers are notified when the user is available, busy, or away from the computer or do so automatically based on the user's activity level on their computer or activity within the Instant Messaging system itself. In most cases, the user is allowed to manually override the automated presence state. On the other hand, recipients of instant messages do not necessarily have to respond immediately to incoming messages. For this reason, users consider communication via instant messaging to be less intrusive than communication via telephone. However, some systems allow the sending of messages to people not currently logged on (offline messages), thus removing much of the difference between instant messaging and email.

SUMMARY OF THE INVENTION

The present invention provides a method of integrating instant messaging clients and voice mail systems without some of the costs and disadvantages for doing so in the prior art. For example, the illustrative embodiment enables a user of an instant messaging client to forward an audio recording such as a voice memo to another person via his or her instant messaging client. The recipient's instant messaging client then inquires whether the recipient would like to hear the audio recording immediately much in the way that an instant messaging client can prompt a user to accept a file that is being sent to them. If the recipient accepts, then the audio recording is downloaded and played for the recipient through a plug-in user interface in the instant messaging client. In contrast, if the user declines, or is "unavailable," or does not respond, the instant messaging client forwards the audio recording to the voice mailbox associated with the recipient for later retrieval in a well-known fashion via a telephone or other voicemail user interface. This invention is particularly advantageous when the recipient is engaged in a telephone call when the audio recording arrives because it enables the recipient to hear the message immediately and without having to access the voice mail system while engaged in call.

The illustrative embodiment comprises: recording an audio recording on the first data processing system; initiating a telephone call between a second user and a third user via the Public Switched Telephone System; transmitting the audio recording via the first instant messaging client on the first data processing system to the second user via a second instant messaging client on the second data processing system; and playing the audio recording for the second user via the second data processing system while the second user is engaged with the telephone call with the third user.

BRIEF DESCRIPTION OF THE DRAWINGS

FIG. 4 depicts a flow chart of the salient tasks associated with the performance of task 302.

DETAILED DESCRIPTION

Figure 1:
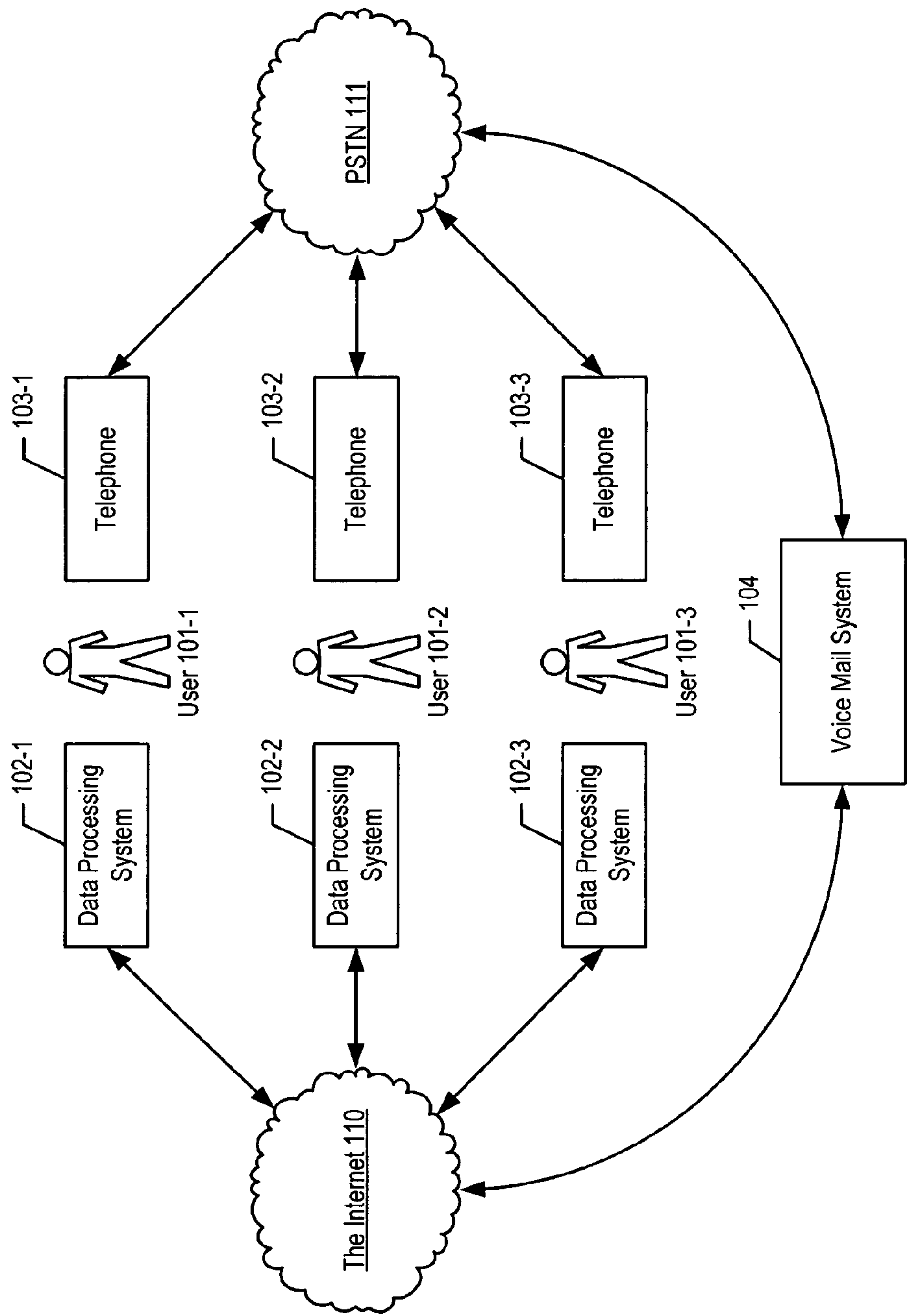
FIG. 1 depicts a block diagram of the salient components of the illustrative embodiment of the present invention.

FIG. 1 depicts a block diagram of the salient components of the illustrative embodiment of the present invention. Telecommunications system 100 comprises: the users 101-1 through 101-3, data processing systems 102-1 through 102-3, telephones 103-1 through 103-3, voice mail system 104, the Internet 110, and the Public Switched Telephone Network 111, interconnected as shown.

Although the illustrative embodiment depicts three users, three data processing systems, and three telephones it will be clear to those skilled in the art, after reading this disclosure, how to make and use alternative embodiments of the present invention that use any number of users, data processing systems, and telephones.

User 101-i, wherein i is a member of the set {1, 2, 3}, is a natural person and a user of data processing system 102-i and telephone 103-i.

Data processing system 102-i comprises hardware and software for performing the tasks described in detail below and in the accompanying figures. In accordance with the illustrative embodiment, each of data processing systems 102-1, 102-2, and 102-3 are connected to the Internet 110 via a wireline connection, but it will be clear to those skilled in the art, after reading this disclosure, how to make and use alternative embodiments of the present invention in which any or all of the data processing systems are connected to the Internet 110 via a wireless connection. In accordance with the illustrative embodiment, each of data processing systems 102-1, 102-2, and 102-3 are identical, but it will be clear to those skilled in the art, after reading this disclosure, how to make and use alternative embodiments of the present invention in which any or all of the data processing systems are not identical.

Telephone 103-i comprises hardware and software for performing the tasks described in detail below and in the accompanying figures. In accordance with the illustrative embodiment, each of telephones 103-1, 103-2, and 103-3 are connected to the Public Switched Telephone Network 111 via a wireline connection using the tip-ring protocol, but it will be clear to those skilled in the art how to make and use alternative embodiments of the present invention in which any or all of telephones are connected to the Public Switched Telephone Network via a wireless connection or a different protocol.

Voice mail system 104 comprises hardware and software for receiving, storing, forwarding, and playing voice mail messages as described below and in the accompanying figures. It will be clear to those skilled in the art, after reading this disclosure, how to make and use voice mail system 104.

The Internet 110 is the ubiquitous packet network and it will be clear to those skilled in the art how to extend and use the Internet. Although the illustrative embodiment uses the Internet as the communications network through with the data processing systems and voice mail system 104 communicate, it will be clear to those skilled in the art, after reading this disclosure, how to make and use alternative embodiments of the present invention that use any telecommunications network (e.g., the Public Switched Telephone Network, a wireless network, an IBM SNA network, etc.) to connected the data processing systems and voice mail system 104.

The Public Switched Telephone Network ("PSTN") 111 is the ubiquitous circuit-switched telephone network and it will be clear to those skilled in the art how to extend and use the Public Switched Telephone Network. Although the illustrative embodiment uses the Public Switched Telephone Network as the communications network through which the telephones and voice mail system 104 communicate, it will be clear to those skilled in the art, after reading this disclosure, how to make and use alternative embodiments of the present invention that use any telecommunications network (e.g., the Internet, a wireless network, an IBM SNA network, etc.) to connected the data processing systems and voice mail system 104.

Figure 2:
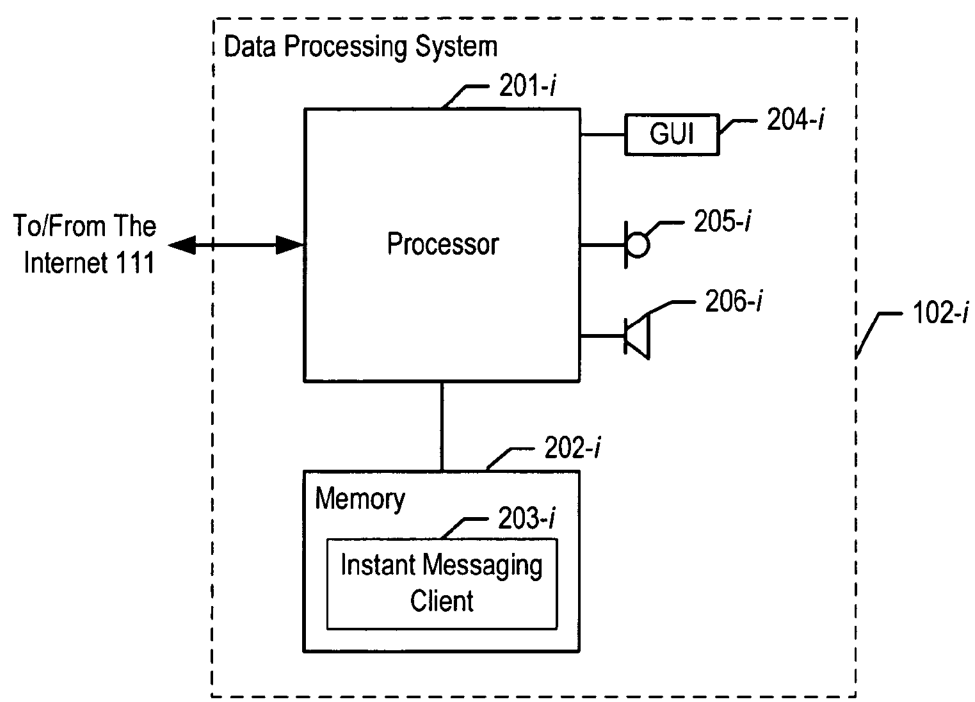
FIG. 2 depicts a block diagram of the salient components of data processing system 102-i, which comprises: processor 201-i, memory 202-i, instant messaging client 203-i, graphical user interface 204-i, microphone 205-i, and speaker 206-i, interconnected as shown.

FIG. 2 depicts a block diagram of the salient components of data processing system 102-i, which comprises: processor 201-i, memory 202-i, instant messaging client 203-i, graphical user interface 204-i, microphone 205-i, and speaker 206-i, interconnected as shown.

Processor 201-i is hardware, as is well known in the prior art, for executing commands in memory 202-i, for storing into and retrieving data from memory 202-i, for transmitting packets to and receiving packets from the Internet, and for interfacing with graphical user interface 204-i, microphone 205-i, and speaker 206-i. It will be clear to those skilled in the art how to make and use processor 201-i.

Memory 202-i is a non-volatile storage, as is well known in the art, for storing programs and data, including instant messaging client 203-i. It will be clear to those skilled in the art how to make and use memory 202-i.

Instant messaging client 203-i is a program that transmits text and audio in accordance with the instant messaging protocol and in the manner described in detail below and in the accompanying figure.

Graphical user interface 204-i comprises a display, keyboard, and pointing device for enabling a user of data processing system 102-i to control data processing system 102-i in general and instant messaging client 203-i in particular. It will be clear to those skilled in the art how to make and use graphical user interface 204-i.

Microphone 205-i is an electro-acoustic transducer for converting an acoustic signal (e.g., speech, etc.) into an electro-magnetic representation of that acoustic signal. It will be clear to those skilled in the art how to make and use microphone 205-i.

Speaker 206-i is an electro-acoustic transducer for converting an electro-magnetic signal into an acoustic representation of that electro-magnetic signal. It will be clear to those skilled in the art how to make and use speaker 206-i.

Figure 3:
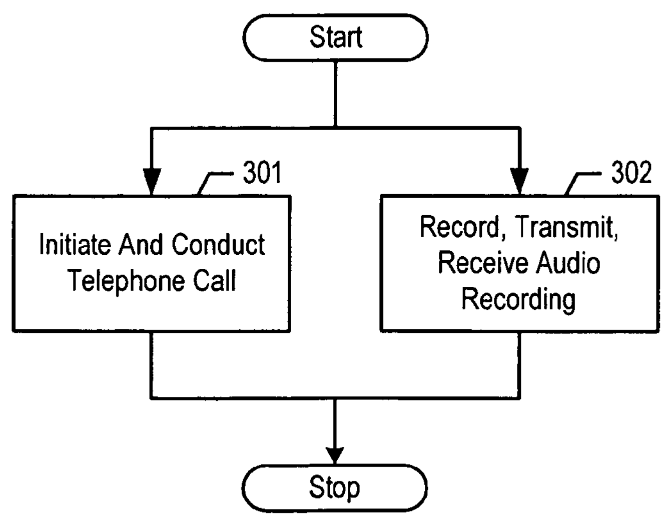
FIG. 3 depicts a flowchart of the salient tasks associated with the performance of the illustrative embodiment of the present invention.

FIG. 3 depicts a flowchart of the salient tasks associated with the performance of the illustrative embodiment of the present invention. In accordance with the illustrative embodiment, tasks 301 and 302 are performed concurrently, but it will be clear to those skilled in the art, after reading this disclosure, how to make and use alternative embodiments of the present invention in which either task 301 or task 302 is performed first.

At task 301, user 101-2 initiates a telephone call with user 101-3 via telephones 103-2 and 103-3 and Public Switched Telephone Network 111. It will be clear to those skilled in the art how to perform task 301.

At task 302, user 101-1 records an audio recording and transmits it to users 101-2 and 101-3. Task 302 is described in detail below and in the accompanying figure.

FIG. 4 depicts a flow chart of the salient tasks associated with the performance of task 302.

At task 401, user 101-1, who is using data processing system 102-1 and instant messaging client 203-1, records an audio recording in well-known fashion.

At task 402, user 101-1, uses instant messaging client 203-1 to transmit the audio recording via the Internet 110 to instant messaging client 203-2 on data processing system 102-2 and to instant messaging client 203-3 on data processing system 102-3.

At task 403-1, instant messaging client 203-2 receives the audio recording from instant messaging client 203-1, and at task 403-2, instant messaging client 203-3 receives the audio recording from instant messaging client 203-1.

At task 404-1, instant messaging client 203-2 notifies user 101-2 of the arrival of the audio recording and user 101-2 decides whether or not to accept the audio recording. When user 101-2 accepts the audio recording—meaning that user 101-2 desires to hear the audio recording immediately—control passes to task 405-1. In contrast, when user 101-2 does not accept the audio recording—either because he or she explicitly denies it, or because he or she does not respond in a timely manner to the inquiry—control passes to task 406-1. Because user 101-2 is engaged in the telephone call with user 101-3, it is likely that user 101-2 will not accept the audio recording.

At task 404-2, instant messaging client 203-3 notifies user 101-3 of the arrival of the audio recording and user 101-3 decides whether or not to accept the audio recording. When user 101-3 accepts the audio recording—meaning that user 101-3 desires to hear the audio recording immediately—control passes to task 405-2. In contrast, when user 101-3 does not accept the audio recording—either because he or she explicitly denies it, or because he or she does not respond in a timely manner to the inquiry—control passes to task 406-2. Because user 101-3 is engaged in the telephone call with user 101-2, it is likely that user 101-3 will not accept the audio recording.

At task 405-1, instant messaging client 203-2, using data processing system 102-2, plays the audio recording for user 101-2. At task 405-2, instant messaging client 203-3, using data processing system 102-3, plays the audio recording for user 101-3.

At task 406-1, instant messaging client 203-2 sends the audio recording to voice mail system 104 for storage in a voice mailbox associated with user 101-2. At task 406-2, instant messaging client 203-3 sends the audio recording to voice mail system 104 for storage in a voice mailbox associated with user 101-3.

At task 407-1, user 101-2, using telephone 103-2 and Public Switched Telephone Network 111, retrieves the audio recording from voice mail system 104 and plays the audio recording, in well-known fashion. At task 407-2, user 101-3, using telephone 103-3 and Public Switched Telephone Network 111, retrieves the audio recording from voice mail system 104 and plays the audio recording, in well-known fashion.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:

recording an audio recording on a first data processing system;

initiating a telephone call between a second user and a third user via the Public Switched Telephone System;

transmitting the audio recording via a first instant messaging client on the first data processing system to the second user via a second instant messaging client on a second data processing system;

playing the audio recording for the second user via the second data processing system while the second user is engaged with the telephone call with the third user;

transmitting the audio recording via the first instant messaging client on the first data processing system to a third user via a third instant messaging client on a third data processing system;

when the third user accepts the audio recording in the third instant messaging client, playing the audio recording for the third user via the third data processing system; and when the third user fails to accept the audio recording in the third instant messaging client, transmitting the audio recording to a voice mailbox associated with the third user.

2. The method of claim 1 wherein the audio recording is transmitted from the first data processing system to the second data processing system via the Internet.

3. A method comprising:

recording an audio recording of a first user;

transmitting the audio recording and a first instant messaging client on a first data processing system to a second user via a second instant messaging client on a second data processing system;

when the second user accepts the audio recording in the second instant messaging client, playing the audio recording for the second user via the second data processing system; and when the second user fails to accept the audio recording in the second instant messaging client, transmitting the audio recording to a voice mailbox associated with the second user.

4. The method of claim 3 further comprising:

transmitting the audio recording via the first instant messaging client on the first data processing system to a third user via a third instant messaging client on a third data processing system;

when the third user accepts the audio recording in the third instant messaging client, playing the audio recording for the third user via the third data processing system; and when the third user fails to accept the audio recording in the third instant messaging client, transmitting the audio recording to a voice mailbox associated with the third user.

5. The method of claim 3 wherein the second user is engaged in a telephone call at the time that the second user accepts the audio recording in the second instant messaging client.

6. The method of claim 3 further comprising:

retrieving the audio recording from the voicemail associated with the second user through a telephone; and playing the audio recording through the telephone.

7. The method of claim 3 wherein the audio recording is transmitted from the first data processing system to the second data processing system via the Internet.

8. A method comprising:

initiating a telephone call between a first user and a second user via the Public Switched Telephone System;

recording an audio recording of the first user;

transmitting the audio recording via a first instant messaging client on the first data processing system to the second user via a second instant messaging client on the second data processing system;

playing the audio recording for the second user via the second data processing system;

transmitting the audio recording via the first instant messaging client on the first data processing system to a third user via a third instant messaging client on a third data processing system;

when the third user accepts the audio recording in the third instant messaging client, playing the audio recording for the third user via the third data processing system; and when the third user fails to accept the audio recording in the third instant messaging client, transmitting the audio recording to a voice mailbox associated with the third user.

9. The method of claim 8 wherein the audio recording is transmitted from the first data processing system to the second data processing system via the Internet.

* * * * *